Sept. 9, 1969 W. E. BRON ET AL 3,466,616

MEMORY DEVICE AND METHOD USING DICHROIC DEFECTS

Filed Oct. 22, 1965 2 Sheets-Sheet 1

INVENTORS

WALTER E. BRON

RUSSELL W. DREYFUS

WILLIAM R. HELLER

BY

Bernard N. Wiener

ATTORNEY

Sept. 9, 1969 W. E. BRON ET AL 3,466,616
MEMORY DEVICE AND METHOD USING DICHROIC DEFECTS
Filed Oct. 22, 1965 2 Sheets-Sheet 2
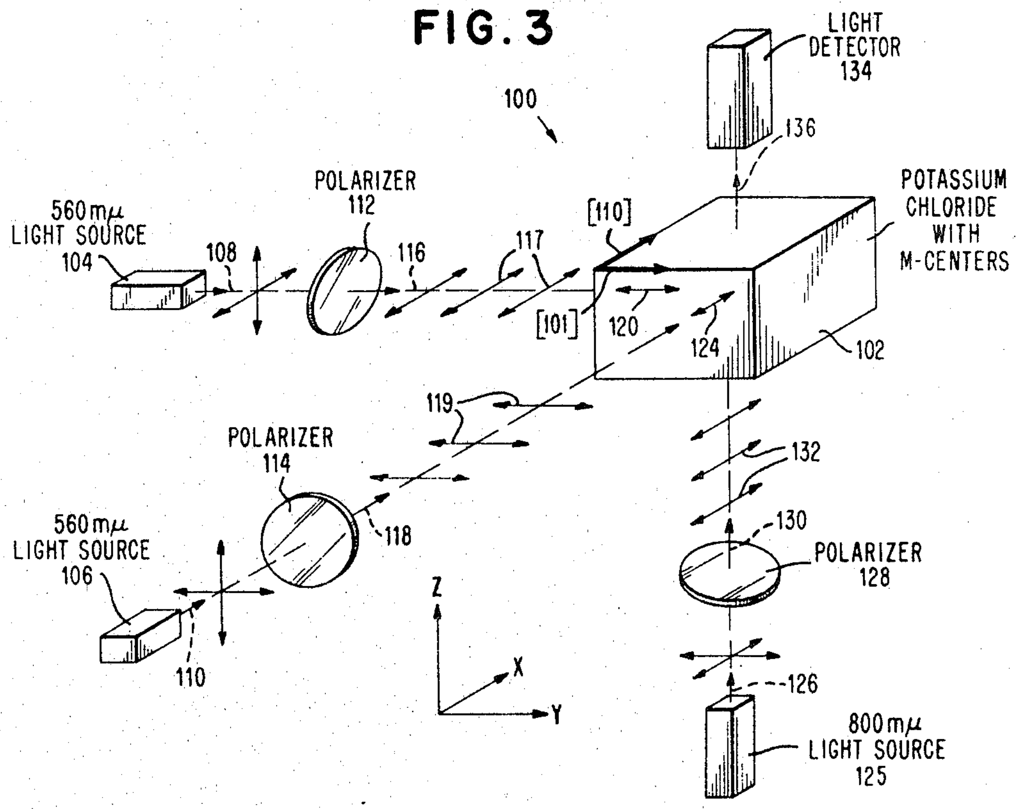
FIG. 3
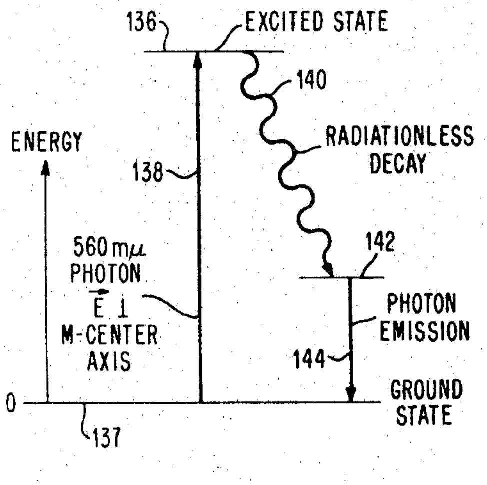
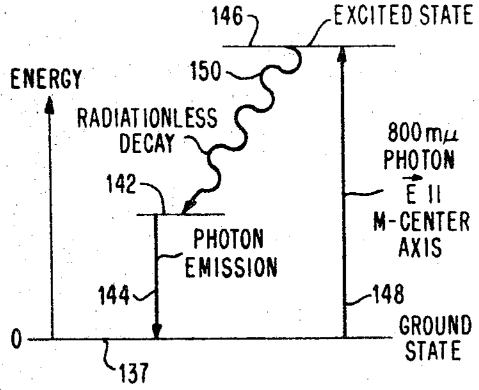
FIG. 4A FIG. 4B United States Patent Office 3,466,616

Patented Sept. 9, 1969

3,466,616
MEMORY DEVICE AND METHOD USING DICHROIC DEFECTS

Walter E. Bron, Briarcliff Manor, and Russell W. Dreyfus, Cross River, N.Y., and William R. Heller, Saratoga, Calif., assignors to International Business Machines Corporation, Armonk, N.Y., a corporation of New York Filed Oct. 22, 1965, Ser. No. 502,041
Int. Cl. G11b 7/00, 9/00
U.S. Cl. 340—173 26 Claims

ABSTRACT OF THE DISCLOSURE

A memory is provided for storage and retrieval of information by the interaction of optical radiation with a crystalline region. Various information states are established in the crystalline region as particular orientations of localized lower symmetry configurations, e.g., dichroic defects, dispersed therein. The particular spatial orientations of the configurations are established relative to the crystal axes by optical energy. The character of transmission of optical energy by the crystalline region is an identification of the stored information state.

This invention relates generally to a memory in which information states are established in a material by electromagnetic energy, and it relates more particularly to a memory in which an anisotropic physical property in a crystalline region thereof is selectively altered by electromagnetic energy with respect to crystal axes for information states.

The prior art has provided memories wherein incident electromagnetic energy establishes an anisotropic physical property of a crystalline region as an information state, e.g., a magnetic material having a rectangular hysteresis loop in which a change of information state is obtained in a storage unit by a current pulse. Such memories are not readily provided with a varied degree and extent of the property in contiguous zones of a crystalline region; and the number of differentiable discrete information states in the crystalline region is usually quite limited. Generally, these prior art memory devices are used in bistable operation.

It is an object of this invention to provide a memory having localized lower symmetry configurations in a crystalline region whose orientations are selectively established relative to crystal axes by electromagnetic energy as information states.

It is another object of this invention to provide a memory having a material with selected orientations of localized lower symmetry configurations dispersed in a crystalline region thereof representative of information.

It is another object of this invention to provide a memory utilizing electromagnetic radiation to alter the orientations of localized anisotropic physical configurations in a crystalline region for a change of information state stored therein and to interrogate said state.

It is another object of this invention to provide a memory using different orientations of dichroic defects, e.g., dichroic color centers, in a crystalline region established by optical radiation as various information states.

It is another object of this invention to provide a memory using dichroic color centers which are established in a crystalline region by incident optical radiations from respective lasers, e.g., injection lasers, as various information states.

It is another object of this invention to provide a memory in which a gradient of orientations of localized lower symmetry configurations representative of information, e.g., analog information, is established in a crystalline region by electromagnetic radiation.

Generally, this invention provides a memory for storage and retrieval of information in which various information states are established in a crystalline region as localized lower symmetry configurations, e.g., dichroic defects, dispersed therein. This is accomplished by establishing particular spatial orientations of the configurations relative to the crystal axes by electromagnetic energy and by determining the character of transmission of electromagnetic energy by the region as identification of the information states.

More particularly, a memory for the practice of this invention incorporates a crystalline region with dichroic defects dispersed therein. Incident optical radiation establishes the dichroic defects along a particular crystal direction by interaction with a component of the optical transition (electric) dipole moment of each defect. An information state of the memory is a particular orientation of the dichroic defects in the crystalline region such that there exists selective absorption for optical radiation incident thereon which is readily detected by a transmission detector.

The foregoing and other objects, features and advantages of the invention will be apparent from the following more particular description of preferred embodiments of the invention as illustrated in the accompanying drawings.

In the drawings:

FIG. 3 is a schematic diagram of another embodiment of the invention in which M-centers dispersed in an alkali-halide crystalline region are established in different orientations by linearly polarized optical radiations with their electric field vectors in different directions.

FIGS. 4A and 4B are exemplary energy level diagrams illustrating that an M-center in an alkali-halide crystalline region when energized to an excited state by photons of different wavelengths loses the absorbed energy differently.

Physics of invention

Figure 1:
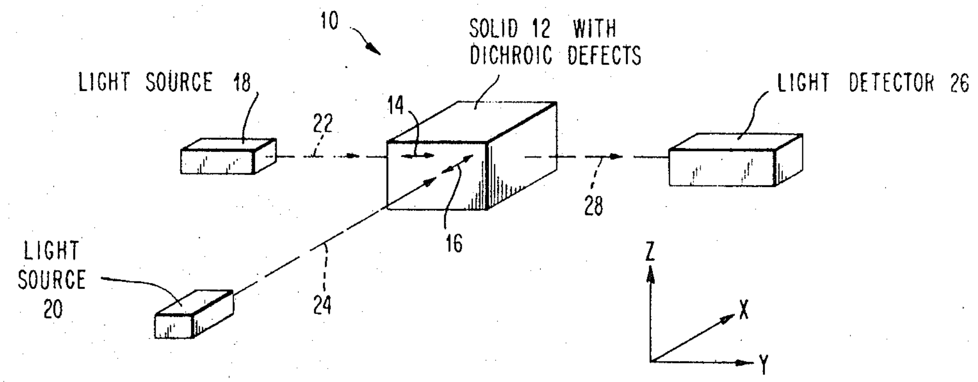
FIG. 1 is a schematic diagram of an embodiment illustrating the storage of various information states as different orientations of dichroic defects in a crystalline region by electromagnetic radiations and the retrieval of the stored information through measurement of the transmission by the region of electromagnetic radiation.

Point imperfections in a crystal lattice, such as vacancies, interstitial atoms and impurity atoms, are configuration locations therein at which the lattice is not perfect, but extended defects such as dislocations are excluded. If a defect has lower symmetry than the symmetry of the lattice, its orientation and anisotropic properties may be altered by external means. Symmetry is a measure of geometric regularity. A background text for a discussion of symmetry in a crystalline region is Introduction to Solid State Physics, by C. Kittel, second edition, John Wiley & Sons, Inc., 1956, chapter 1. Under some circumstances, the axes of such defects can be oriented in different directions relative to the crystal axes via absorption of energy from electromagnetic radiation. A defect configuration in a crystalline lattice can interact with the electric field of an incident photon via the defect's optical transition dipole moment. The term "dichroism" defines the physical property of some defects that the absorption of optical radiation is dependent on the angle between the electric field vector of the incident radiation and the orientation of an axis of symmetry of the defect.

When a photon interacts with a defect, the energy of the defect is increased from its ground state to an excited state, and for high efficiency of excitation, the photon energy must approximate the energy difference between the ground and excited states.

Various dichroic defects dispersed within a crystalline region can serve for the practice of this invention. Thus, lattice complexes of vacancies, interstitial atoms or impurity atoms which manifest dichroic behavior are suitable for the practice of this invention. Vacancies are lattice sites in a crystalline region where the ions are absent which would normally occupy them. At negative ion vacancies, an electron or several electrons may be present and be capable of absorbing and radiating electromagnetic radiation. Where two negative ion vacancies are adjacent in an alkali-halide crystalline lattice and each is occupied by an electron, the electron-vacancy complex is termed an M-center. Interstitials are ions found within the crystal lattice on non-lattice site locations. Impurity ions are ions present in a crystalline region either as interstitial ions or substitutional ions but which are of a different ionic specie than any ion which properly should be located on a lattice site.

Criteria of suitable dichroic defects for the memory device of this invention are: at least one identifiable end of a defect must be capable of rotational motion relative to the other identifiable end; and the defect itself must be capable of absorbing a relatively large amount of radiation energy and of transferring it rapidly as heat to the crystal lattice. In contrast, a rare earth ion and vacancy complex, which is characterizable as a defect, does not give up sufficient photon energy to the lattice and is of limited utility for the practice of this invention.

Color centers are lattice defects in which trapped electrons or trapped holes absorb and emit radiation with consequent effect upon the optical absorption of the crystal. The text, Color Centers in Solids by J. H. Schulman and W. D. Compton, the Macmillan Company, New York, 1962, especially pages 113 to 128, is of background interest for the practice of this invention when using color centers. Further, there are references noted on the indicated pages which provide more extensive background material. The capability of a color center for absorbing electromagnetic radiation is expressed in terms of its optical transition dipole moment. Defects which have optical transition dipole moments are suitable for the practice of this invention.

Some types of dichroic color centers are stimulated by radiation to change their spatial orientation relative to the crystal directions. Although the orientations of dichroic color centers are not changed significantly at low temperature through random thermal fluctuations, at temperatures substantially above room temperature, their random thermal vibrations can impair retrieval of an information state. A memory for the practice of this invention should be maintained at sufficiently low temperature to limit change of orientation due to ambient thermal effects. Information states of the memory are effectively stable, although from a scientific viewpoint they are properly termed metastable or quasi-permanent, as under certain conditions there is a finite probability that an information state may be changed through normal thermal fluctuations.

An M-center is a dichroic color center produced by the cooperative relationship between two electrons occupying vacancies at two proximate halide ion sites of an alkali-halide crystal. It has several optical transition dipole moments corresponding to different absorption wavelengths of light. Sufficient energy may be absorbed from incident radiation by an M-center to effect a strong momentary perturbation of the crystalline lattice sufficient to "melt it" locally. After the lattice has "re-crystallized," many of the energized M-centers have changed their spatial orientations, and since there is a much higher probability that only one of the two electron-vacancy complexes of an M-center moves to another equivalent site in the proximity than for both electron-vacancy complexes to move, the probability of orientation change of its axis is much greater than the probability of a linear translation thereof.

An M-center has three mutually perpendicular optical transition dipole moments, and there are different consequences so far as orientation change of a particular M-center is concerned for interaction with polarized light whose electric field vector is either parallel or perpendicular to the axis of the M-center, i.e., the direction between the vacancies. Illustratively, for potassium-chloride, light of 560 millimicrons wavelength with its electric field polarized perpendicular to the M-center axis causes change of orientation, whereas light of 800 millimicrons wavelength with its electric field polarized parallel to the M-center axis does not cause change of orientation.

Another dichroic defect suitable for practice of this invention is an A-center. An A-center is composed of an F-center (electron in a vacancy) which has as a nearest neighbor an alkali-ion impurity. This provides an anisotropic configuration with axes in the <100> directions. Illustratively, a suitable A-center is provided in potassium-chloride by a F-center having a lithium ion as a nearest neighbor.

It is the basic interaction of a photon with the optical transition dipole moment of a dichroic defect that ultimately gives rise to a change of information state in a memory according to this invention. Although any light source providing a sufficient number of photons of the appropriate energy will serve, where the light source is bulky, conventional optical focusing techniques may be desirably utilized.

Lasers are advantageous practical sources of light energy suitable for the orientation of dichroic defects according to this invention allowing memories to be built inexpensively, to operate in microsecond times, and be fabricated into compact arrays. Although solid state injection lasers are not presently available at all requisite frequencies for practice of this invention with every crystal lattice capable of maintaining suitable dichroic defects, injection lasers which are available taken together with gas lasers and other conventional light sources make possible the practice of the invention with all presently known materials and dichroic defects capable of orienting via interaction of incident light with their optical transition dipole moments.

Practice of invention

Certain criteria determine the selection of a solid as a memory cell for a memory in accordance with the practice of this invention. Defects are suitable if they are capable of having several definite and constant spatial orientations relative to the crystal axes, i.e., they are localized anisotropic physical configurations; and have lower symmetry than the point symmetry of the crystal lattice itself, i.e., they are localized lower symmetry configurations. Illustratively, in the crystal lattice of cubic potassium-chloride, the dichroic defects may be two adjacent anion vacancies each with an electron thereat, i.e., and M-center, or a vacancy-impurity ion complex, which displays lower than cubic symmetry. A dichroic defect can also be obtained from a point defect which can occupy several distinct types of sites, such as an intersitial ion which occupies only face-centered positions in a monoclinic lattice. Vacancies and interstitial ions are the only known point defects capable of very rapid motion in a crystalline lattice, and every dichroic defect for the practice of this invention desirably includes one such defect as a constituent. The other constituent or constituents of the dichroic defect may be impurity ions, vacancies, or interstitials.

To obtain a change of information state in a memory, an incident light-radiation photon interacts with the dipole moment of a dichroic color center and causes it to orient its axis along a selected crystal axis. A photon is absorbed by an atom or molecule or by the electron in a vacancy, and this absorbed energy is transferred as thermal energy to the crystal lattice, thereby a "hot spot" is created at that particular location in the crystalline region.

As energy of optical photons is in the range from 1.4 electron volts to 6.0 electron volts, the local temperature is increased significantly, i.e., the temperature exceeds the melting point of most crystalline materials for a radius of about 5 Angstrom units around the activated dichroic defect for a time interval of approximately $10^{-12}$ seconds. As a result of the high local temperature, the ions in the vicinity move almost randomly from one lattice site to another, and after the thermal energy has been absorbed by the bulk crystal lattice, there is a high probability that the energy absorbing dichroic defect is in a different orientation.

The number of possible orientations for a dichroic defect in a crystalline region depends upon both the nature of the defect and the nature of the crystal. Illustratively, the axis of an M-center is defined as the direction joining the two anion vacancies. In the cubic lattice of potassium-chloride, the axis of an M-center can be oriented along any one of the six face-diagonal <110> directions of the basic halide cube. It has been determined experimentally that M-centers in potassium-chloride have an absorption band at 560 millimicrons wavelength for polarized light with its electric field vector perpendicular to the M-center axis and an absorption band at 800 millimicrons for polarized light with its electric field vector parallel to the M-center axis.

An aspect of this invention is a material having localized lower symmetry configurations dispersed therein selectively oriented in a crystal line region thereof in accordance with information represented. The information is discerned through detection of the absorption of electromagnetic radiation in the crystalline region. In particular, the material is an alkali-halide crystal, and the localized lower symmetry configurations are dichroic defects, e.g., potassium-chloride with M-centers therein.

Localized lower symmetry configurations in a crystalline region can be selectively oriented on an atomic or molecular basis for the practice of this invention. Therefore, the information represented by the orientations of the configurations can be established with contrast and resolution dependent solely on the density of the configurations but is limited by the focusing and intensity characteristics of the incident electromagnetic radiation in the region.

Embodiments of the invention

The invention will now be described with reference to FIG. 1 which is a schematic diagram illustrating a memory device 10 having a solid or region of crystalline material 12 with dichroic defects 14 and 16 dispersed therein, together with two light sources 18 and 20 and a light detector 26. The memory device 10 comprising the crystalline region 12 is shown with exemplary defects 14 and 16 oriented along the Y and X crystal axes directions, respectively, considering for illustrative purpose that the dipole moments are along the axes of the defects. Light sources 18 and 20 present incident radiations 22 and 24, respectively, to crystalline region 12. Light detector 26 is placed in light receiving relationship for light 28, which started from source 18 as light 22, exiting from region 12 along the Y direction.

In the operation of memory device 10, light sources 18 and 20 provide light pulses of appropriate wavelength for energizing dichroic defects dispersed in crystalline region 12. Illustratively, if the dichroic defects in the region 12 are originally randomly oriented, the incident radiation 22 from light source 18 tends to orient the defects along the Y axis as dichroic defects 14. Once the dichroic defects are oriented along the Y axis they are not further excited by incident radiation 22.

The photons of the incident radiation 22 or 24 interact with the dichroic defects in crystalline region 12 via their optical transition dipole moments. The excitation increases locally the electronic energy of the dichroic defects, which is partially or totally dissipated via radiationless transitions with consequent transfer of absorbed energy to the crystalline lattice.

Light detector 26 is utilized to obtain a measure of the information state established in crystalline region 12. Light source 18 is pulsed so that the intensity of incident light 22 is much weaker than when the dispersed dichroic defects were oriented by incident light radiations 22 or 24 as exemplary defects 14 or 16. The intensity of the exiting light 28 is a measure of the light transmission by crystalline region 12. Illustratively, if the dichroic defects are oriented as defects 16, the transmitted light measured by light detector 26 is weaker than if they are oriented as defects 14. If the orientation of the defects in region 12 is as defect 16, light 22 is partially absorbed, and if the orientation is as defects 14, light 22 passes through region 12 without significant absorption.

Figure 2A:
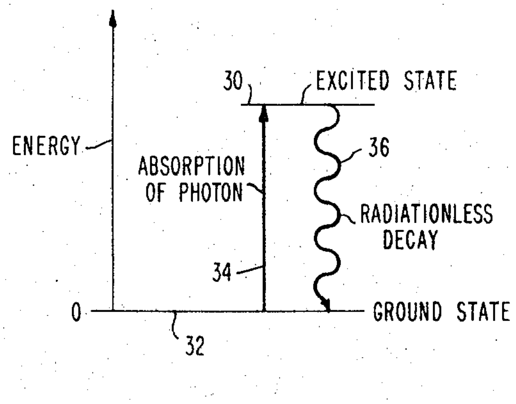
FIGS. 2A and 2B are exemplary energy level diagrams for two modes of energy transfer from a dichroic defect in a crystalline region which has absorbed energy from an incident photon.

The physics of the energization of dichroic color centers in the crystalline region 12 of memory device 10 will be described with reference to FIGS. 2A and 2B. FIG. 2A illustrates the excited state of a dichroic defect and the transformation of the absorbed photon energy completely to thermal energy by radiationless decay; and FIG. 2B illustrates a circumstance in which a portion of the absorbed photon energy is transformed to thermal energy through radiationless decay and a portion thereof is transformed to a photon of lower energy than that of the energizing photon.

With reference to FIG. 2A, the excited state 30 is either for an electron in a vacancy in the crystalline region or for a shell electron of an ion, an interstitial ion, molecular impurity, or an impurity ion. The absorption of the incident photon is characterized by the arrow line 34 directed from the ground state 32 to the excited state 30; and the radiationless decay is indicated by the wavy line 36 directed from the excited state 30 to the ground state 32. With radiationless decay 36, the energy of an electron is degraded from the excited state to thermal energy as lattice vibration without photon emission.

Figure 2B:
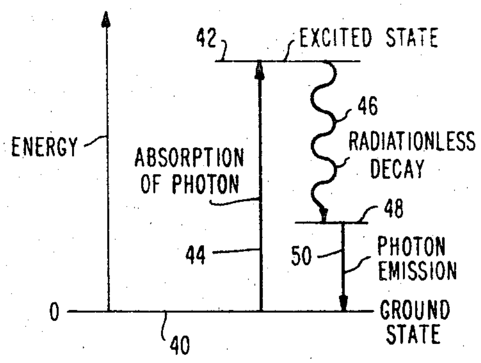

In FIG. 2B, there is illustrated energization of an electron of a dichroic defect from ground state 40 to excited state 42 by photon absorption indicated by arrow line 44 directed from ground state 40 to excited state 42. The excited state 42 is transformed back to the ground state via a two-part process: of radiationless decay indicated by wavy line 46 from excited state 42 to intermediate state 48; and of emission of a photon of decreased energy than the energizing photon represented by arrow line 50 directed from intermediate state 48 to ground state 40.

Another embodiment 100 of this invention utilizing M-centers dispersed in an alkali-halide crystalline region as the dichroic defects will now be described with reference to FIG. 3. Embodiment 100 has a crystalline region 102 of potassium-chloride in light receptive relationship with light beams 108 and 110 from light sources 104 and 106, respectively. Light beam 108 from light source 104 is directed toward crystalline region 102 along the Y axis of the X, Y and Z spatial frame, i.e., along the [101] crystal direction; and the light beam 110 from light source 106 is directed toward region 102 along the X axis of the spatial frame, i.e., along the [110] crystal direction. Light polarizers 112 and 114 are between light sources 104 and 106, respectively, and region 102. Polarizers 112 and 114 provide linearly polarized light beams 116 and 118 with their electric field vectors 117 and 119, respectively, oriented in space to interact with the optical transition dipole moments of the M-centers in crystalline region 102.

Illustratively, M-centers 120 and 124 in crystalline region 102 are shown for different information states. If polarized light beam 108 has wavelength of 560 millimicrons, M-centers in crystalline region 102 whose main axes have components along the Y and Z directions interact with the electric field vector 117 and become oriented as M-center 124. Similarly, M-centers in crystalline region 102, with Y and Z components of their main axes, become oriented as M-center 120 as a result of the interaction with electric field vector 119 of light 118.

Detection of the information state of crystalline region 102 of FIG. 3 will now be described. Light source 125 provides light beam 126 of 800 millimicrons wavelength toward crystalline region 102 along the Z direction. Polarizer 128 passes linearly polarized light 130 with electric field vectro 132 in the X direction. Light detector 134 is disposed to receive light transmitted by region 102 in the Z direction. If the M-centers in region 102 are oriented in the X direction as M-center 124 for an information state, there is significant absorption of light beam 130. Accordingly, light detector 134 does not receive very much transmitted light, i.e., transmitted light beam 136 has considerably less intensity than incident light beam 130. However, if the information state is established with the M-centers oriented in the Y direction as M-center 120, incident light beam 130 is almost entirely transmitted to detector 134.

The physics of light absorption and transmission in crystalline region 102 of FIG. 3 of potassium-chloride will be described with reference to FIGS. 4A and 4B. FIG. 4A illustrates energy levels for incident light having wavelength of 560 millimicrons and linearly polarized with electric field vector perpendicular to the main axis of absorbing M-center. This absorption causes a change in orientation of the M-centers in the crystalline region 102. FIG. 4B illustrates energy levels for incident linearly polarized light having wavelength of 800 millimicrons with electric field vector parallel to the main axis of absorbing M-center. This absorption does not cause a significant change in orientation of the M-centers.

In greater detail, with reference to FIG. 4A, when a photon of 560 millimicrons wavelength is absorbed by an M-center, the energy level of the absorbing M-center is raised to the energy state 136 indicated by arrow line 138. This absorption occurs only if an electric field component of the incident photon is perpendicular to the axis of the M-center. The energy state of the M-center is transformed back to the ground state 137 via a two-step process of radiationless decay to intermediate state 142 indicated by arrow line 140 and emission of a photon indicated by arrow line 144 directed from intermediate state 142 to ground state 137. Radiationless decay 140 imparts thermal energy to the crystal lattice as vibrational energy of the local ions. The changed local thermal condition of the crystal lattice causes a change in orientation of the absorbing M-center with high probability of occurrence.

FIG. 4B illustrates photon energy absorption and subsequent transformation of energy to the vibration of ions of the crystal lattice in which orientation of an M-center does not change. By absorption of a photon of polarized light of 800 millimicrons wavelength having its electric field vector parallel to the M-center axis, the energy state of the M-center is raised to excited state 146 via photon absorption, indicated by arrow line 148 directed from ground state 137 to excited state 146. The absorbed energy in the M-center represented by excited state level 146 is transformed back to the ground state 137 via a two-step process. One step of the transformation process is radiationless decay indicated by wavy line 150 to intermediate state 142 which results in increased vibration energy of the local atoms. The energy in the M-center indicated by intermediate excited state 142 is further reduced by emission of a photon of lower energy than the absorbed photon as indicated by arrow line 144 directed from intermediate excited state 142 to ground state 137. Although the energy represented by radiationless decay 150 is transformed to vibration of the atoms of the crystal lattice, there is a relatively small amount of energy available, and there is a low probability of change of the orientation of the axis of the absorbing M-center.

Practice considerations

For an embodiment of this invention, wherein the crystalline region 102 of FIG. 3 is potassium-iodide, Ga(As-P) injection lasers may be used for the light sources 104 and 106 to provide for an absorption band at 660 millimicrons wavelength in the potassium-iodide. Light detector 134 may be a GaAs diode, and a light source 125 of light of 960 millimicrons wavelength is pulsed with an intensity substantially less than required to establish an information state in region 102 of potassium-iodide.

The time required to change an information state in a crystalline region in the practice of this invention is determined by the density of the dichroic defects and the number of photons which are incident on unit cross section of the region. The number of photons necessary to change the information state is proportional to the volume of the crystalline region. Illustratively, according to a theoretical formulation for an embodiment which utilizes an injection laser light source and assuming 1% efficiency, i.e., 100 photons are required to change the orientation of one M-center, the time for change of information state of a one millimeter cube of alkali-halide crystalline region 102 with $2.5 \times 10^{13}$ M-centers therein is approximately $2.5 \times 10^{-5}$ sec.

The concentration of dichroic defects in a crystalline region is controllable, and as both the wavelength and intensity of incident photons are easily controlled, a memory device is provided whose unit memory cell may be of various sizes and with which switching speed from one information state to another is easily modified.

The practice of this invention includes a storage of information as a gradient of dichroic defects in a crystalline region. Illustratively, analog information is stored in the crystalline region by varying the intensity thereon of the writing light source from point to point; and a picture having contrast is stored in a crystalline region and is viewed with transmitted light.

While the invention has been particularly shown and described with reference to preferred embodiments thereof, it will be understood by those skilled in the art that various changes in form and details may be made therein without departing from the spirit and scope of the invention.

What is claimed is:

1. Memory device using different orientations of localized lower symmetry configurations dispersed in a crystalline region as various stored information states comprising:

a crystalline region with localized lower symmetry configurations dispersed therein;

optical energy source means communicating with said region for selectively establishing different orientations of said configurations representative of various stored information states; and means for determining said established orientations of said configurations for indicating said information states of said region.

2. Memory according to claim 1 in which said means for determining said established orientation of said configurations includes optical energy transmitting means and optical energy receiving means for determining the transmission by said region of said transmitted optical energy.

3. Memory device using selected orientations of localized lower symmetry configurations dispersed in a crystalline region as information comprising:

a crystalline region with localized lower symmetry configurations dispersed therein;

optical radiation source means communicating with said region for orienting said configurations selectively representative of stored information; and optical radiation detection means for determining optical radiation absorption by said configurations in said region for indicating said information.

4. Memory device according to claim 3 in which said localized lower symmetry configurations are dichroic defects.

5. Memory device according to claim 4 in which said crystalline region is alkali-halide and said dichroic defects are dichroic color centers.

6. Memory device according to claim 5 in which said dichroic color centers are M-centers.

7. Memory device according to claim 3 in which said information is represented by a density gradient of said oriented configurations in said region.

8. Memory device according to claim 7 in which said information is analog information.

9. Memory device using different orientations of dichroic defects dispersed in a crystalline region as various information states comprising:

a crystalline region with dichroic defects dispersed therein;

optical radiation source means communicating with said crystalline region for orienting said dichroic defects selectively with respect to crystal directions of said region representative of various stored information states; and optical radiation detection means for determining the transmission of optical radiation by said crystalline region for indicating said information states thereof.

10. Memory device according to claim 9 in which said electromagnetic radiation source means includes a laser.

11. Memory device using different orientations of dichroic color centers dispersed in an alkali-halide crystalline region as various information states comprising:

an alkali-halide crystalline region with dichroic color centers dispersed therein;

optical radiation source means communicating with said crystalline region for orienting said centers selectively with respect to crystal axes of said region representative of various stored information states; and optical radiation detection means for determining the transmission of optical radiation by said crystalline region for indicating said information states thereof.

12. Memory device according to claim 11 in which said light radiation source means includes a laser.

13. Memory device using different orientations of M-centers dispersed in an alkali-halide crystalline region as various information states comprising:

an alkali-halide crystalline region with M-centers dispersed therein;

optical radiation source means communicating with said region, said source means including first and second linearly polarized light sources disposed along different spatial directions for establishing said M-centers in first and second orientations representative of various information states, third linearly polarized light source disposed along another spatial direction; and light detection means for determining the transmission of said third light by said region for indicating said information states thereof.

14. Memory device according to claim 13 in which said first and second linearly polarized light sources are first and second lasers.

15. Memory device according to claim 13 in which said crystalline region is potassium-chloride.

16. Memory device according to claim 13 in which said crystalline region is potassium-iodide.

17. Material having a crystalline region with localized lower symmetry configurations with particular orientations dispersed therein as stored information:

said configurations being oriented selectively in a predetermined manner and in a predetermined volume of said crystalline region representative of said information;

said orientations being detectable as indications of said information through the degree and extent of absorption of optical radiation communicated to said crystalline region.

18. The material of claim 17 in which said configurations are dichroic defects.

19. The material of claim 18 in which said crystalline region is alkali-halide and said dichroic defects are dichroic color centers.

20. The material of claim 19 in which said dichroic color centers are M-centers.

21. Method of storing information comprising the steps of:

storing localized lower symmetry configurations in a crystalline region; and establishing by optical energy said configurations in particular orientations relative to crystal axes of said region representative of stored information.

22. Method according to claim 21 wherein said configuration are dichroic defects.

23. Method according to claim 22 wherein said dichroic defects are dichroic color centers.

24. Method of storing and retrieving information comprising the steps of:

establishing by optical energy particular spatial orientations of localized lower symmetry configurations in a crystalline region relative to crystal axes thereof representative of stored information; and determining the character of transmission of electromagnetic energy by said region to retrieve said stored information.

25. Method according to claim 24 wherein said configurations are dichroic defects.

26. Method according to claim 25 wherein said dichroic defects are dichroic color centers.

References Cited

UNITED STATES PATENTS 2,481,622 9/1949 Rosenthal ------- 178—7.87 X
3,296,594 1/1967 Van Heerden ------- 340—173

TERRELL W. FEARS, Primary Examiner

J. F. BREIMAYER, Assistant Examiner

U.S. Cl. X.R.

330—4,3